3,696,081
HEXAFLUOROISOPROPANOL ACRYLAMIDE

Elemer Domba, Olympia Fields, and Thaddeus A. Krolikiewicz, Westchester, Ill., assignors to Nalco Chemical Company, Chicago, Ill.
No Drawing. Continuation-in-part of application Ser. No. 828,786, May 28, 1967. This application Sept. 22, 1970, Ser. No. 74,510
Int. Cl. C08f 3/90, 15/02
U.S. Cl. 260—78.5 BB  4 Claims

ABSTRACT OF THE DISCLOSURE

The homopolymers and polymers of the new compound hexafluoroisopropanol acrylamide.

---

This is a continuation-in-part of my copending application U.S. Ser. No. 828,786, filed May 28, 1969 now U.S. Pat. No. 3,549,705.

This invention is directed to the new compound, N-hexafluoroisopropanol acrylamide, having the structural formula:

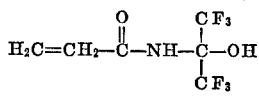

This invention is also directed to polymers prepared from this novel fluorine-containing monomer, as well as to a method for preparing this compound.

N-hexafluoroisopropanol acrylamide is prepared by reacting acrylamide with at least one mole of hexafluoroacetone at a temperature less than 60° C. A temperature of 45°–55° C. is preferred.

In a preferred embodiment of the invention the reaction is conducted in a glycol-ether solvent in which the starting acrylamide monomer is soluble. Such solvents are exemplified by the dimethyl ether of ethylene glycol.

The reaction is usually performed by dissolving the acrylamide monomer in the ethylene glycol ether solvent. This solution is then maintained at a temperature below 60° C. At this point hexafluoroacetone, a gas, is bubbled into the acrylamide solution over a period of time ranging between 5 to 8 hours. At the end of this time the reaction is complete. The time over which the hexafluoroacetone may be added to the acrylamide may be varied in relation to the temperature.

To illustrate the preparation of N-hexafluoroisopropanol acrylamide, the following is presented:

EXAMPLE I

To a reaction kettle fitted with thermometer, Dry Ice condenser, and a stirrer was added 10 liters of the dimethyl ether ethylene glycol. To this was added 2130 gr. (30 moles) of acrylamide. Hexafluoroacetone was introduced at such a rate to raise the temperature to 40° C. After the theoretical hexafluoroacetone was added (30 moles) over a 6 to 8 hour period, the solvent was removed by high vacuum distillation. The residue was then dissolved in ether and crystallized with heptane (hexane could also be used) to obtain a white, crystalline product with a melting point of 53°–54° C.

N-hexafluoroisopropanol acrylamide prepared in accordance with the above example is a novel unsaturated adduct stable under water-free conditions. Infrared and Nuclear Magnetic Resonance studies confirm the monomer structure of the product. When well-known initiators in the art such as Vazo or Azo are used, it is capable of reacting either with itself to form homopolymers or with other vinyl monomers to produce polymers having a variety of useful applications.

The polymers may also be used as a stable source of hexafluoroacetone. This, because of its biological activity, is useful as an insecticide.

The polymerization can take place in the presence of water when the process is initiated by persulfates. In this process the monomer is dissolved in a water-immiscible solvent such as hexane. The polymer must dry quickly due to hydrolytic instability. The resulting homopolymer is thermally stable up to 165° C. Above 165° C. N-hexafluoroisopropanol acrylamide is released.

Copolymers of N-hexafluoroisopropanol acrylamide with other perfluoroacrylates, like heptafluoroisopropylacrylate, show valuable oil-and-waterproofing characteristics for a variety of surfaces, particularly textiles. These copolymers should contain at least 5% by weight of N-hexafluoroisopropanol acrylamide.

To illustrate the variety of polymers that may be prepared from N-hexafluoroisopropanol acrylamide, the following general polymerization technique was used. Bulk polymerization is used. The monomers are introduced into the reactor and a catalyst, such as a Vazo catalyst is added. The reactor is heated to from about 70° to 80° C. for from 6 to 14 hours.

The polymers prepared were soluble in fluorinated solvents. These polymers were sprayed on solid surfaces, such as textiles and leather and showed high water-and-oil repellancy.

To illustrate the variety of polymers that may be prepared by the above generalized techniques, the following information is presented by way of additional examples in Table I below:

TABLE I

| No. | N-hexa-fluoroiso-propanol acrylamide, percent/wt. | Monomer | Catalyst |
|---|---|---|---|
| Ex. II | 100 | | Vazo.* |
| Ex. III | 50 | Acrylonitrile | Do. |
| Ex. IV | 25 | Acrylamide | Do. |
| Ex. V | 80 | Maleic anhydride | Do. |
| Ex. VI | 50 | Vinyl chloride | Do. |
| Ex. VII | 75 | Vinyl acetate | t-Butyl hydroperoxide. |
| Ex. VIII | 50 | Isobutylene | Vazo. |
| Ex. IX | 80 | Acrylic acid | Do. |
| Ex. X | 60 | Methyl vinyl ether | Do. |
| Ex. XI | 80 | N-vinyl pyrrolidone | Do. |
| Ex. XII | 50 | Styrene | Do. |
| Ex. XIII | 85 | Diallylamine | Do. |

* 2,2′-azodiisobutyronitrile.

It is noted that the above examples comprise 25–85% by weight of N-hexafluoroisopropanol acrylamide, and 15–75% by weight of the vinyl monomers selected from acrylonitrile, acrylamide, maleic anhydride, vinyl chloride, vinyl acetate, isobutylene, acrylic acid, methyl vinyl ether, N-vinyl pyrolidone, styrene and diallylamine. Several different free radical catalysts were used. In addition to those catalysts employed above, other free radical catalysts that may be used include: Benzoyl peroxide; lauroyl peroxide; tert-butyl perbenzoate; 1-hydroxycyclohexyl hydroperoxide; tert-butyl peroxide; tert-butyl hydroperoxide; 3-carboxypropionyl peroxide; acetyl peroxide; 2,2′-azodiisobutyramindine dihydrochloride; 2,2′-azodiisobutyronitrile; 2,2′-azobis(2,4-dimethyl-4-methoxyvaleronitrile); sodium peroxide; barium peroxide; hydrogen peroxide; ammonium persulfate; potassium persulfate; and the like.

A 1:1 molar ratio copolymer of N-hexafluoroisopropanol acrylamide and perfluoroisobutyl acrylate (43.6% by weight) was tested to show its efficacy as an oil-and-water repellent for various fabrics. This product was applied to various fabrics with a roller, dried 5 minutes at 250° F., cured for 5 minutes at 320° F., and tested for water-and-oil repellency. The water repellency was measured according to a standard test of the American Association of Textile Chemists and Colorists, test method AATCC-22-1961. Basically, the test involves the sprinkling of fabrics held on an embroidery hoop at a 45° incline with 1 quart of water at 80° F. from a clothes sprinkler held about 8 inches above the fabric. A rating of 100 indicates no penetration of the water, a rating of 90 shows a slight wetting of the fabric, while a rating of 50 shows slight water repellency and a rating of zero shows complete penetration and wetting.

The oil repellency was measured according to the "3M Oil Repellency Test." This test is described in the April 1962 issue of the Textile Research Journal at pp. 323-324. Basically, the test involves applying mixtures of light mineral oil and n-heptane to swatches of treated cloth. The failure to absorb a drop of 100% heptane in three minutes results in a rating of 150, while failure to absorb a drop of 100% mineral oil gives a rating of 50. Absorption of the mineral oil results in a rating of zero. Ratings between 50 and 150 represent various mixtures of mineral oil and n-heptane. Thus a rating of 110 indicates no penetration by a mixture of 60% n-heptane and 40% mineral oil. Generally, a rating in the range of 50-70 indicates only a fair resistance to staining, 80-90 indicates only a fair resistance to staining, 80-90 indicates a good resistance, and 100 or above shows outstanding resistance.

The N-hexafluoroisopropanol acrylamide copolymer at a dosage concentration of .40% by weight showed a water-repellent C rating of 80 and an oil-repellent C rating of 100 on cotton. In the case of sateen fabric the water-repellency rating was 80 and the oil-repellency rating for this polymer on sateen was 80. Copolymers with other fluorinated acrylates dissolved in a fluorine solvent have also shown good oil repellency.

Having thus described our invention, it is claimed as follows:

1. A homopolymer of N-hexafluoroisopropanol acrylamide.
2. An addition copolymer which contains at least 5% by weight of N-hexafluoroisopropanol acrylamide.
3. The copolymer of claim 2 which comprises 25-85% by weight of N-hexafluoroisopropanol acrylamide and 15-75% by weight of a vinyl monomer selected from the group consisting of acrylonitrile, acrylamide, maleic anhydride, vinyl chloride, vinyl acetate, isobutylene, acrylic acid, methyl vinyl ether, N-vinyl pyrolidone, styrene, diallylamine and perfluoroisobutyl acrylate.
4. The copolymer of claim 3 which comprises 43.6% by weight of perfluoroisobutyl acrylate and 56.4% by weight of N-hexafluoroisopropanol acrylamide.

No references cited.

JOSEPH L. SCHOFER, Primary Examiner

C. A. HENDERSON, Jr., Assistant Examiner

U.S. Cl. X.R.

117—142; 252—8.57; 260—80.3 N, 85.5 AM, 85.7 R, 86.1, 87.5 A, 88.1 PN, 89.7 R